(12) United States Patent
Imamura

(10) Patent No.: US 8,111,881 B2
(45) Date of Patent: Feb. 7, 2012

(54) IMAGE PICKUP DEVICE, FACE DETECTION METHOD, AND COMPUTER-READABLE RECORDING MEDIUM

(75) Inventor: Keiichi Imamura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/178,055

(22) Filed: Jul. 7, 2011

(65) Prior Publication Data

US 2011/0261222 A1 Oct. 27, 2011

Related U.S. Application Data

(62) Division of application No. 12/152,890, filed on May 16, 2008, now Pat. No. 8,019,129.

(30) Foreign Application Priority Data

May 18, 2007 (JP) ................................. 2007-133353

(51) Int. Cl.
*G06K 9/00* (2006.01)
*H04N 7/18* (2006.01)
(52) U.S. Cl. ......................... 382/118; 382/181; 348/143
(58) Field of Classification Search .......... 382/100–312; 348/61–161
See application file for complete search history.

(56) References Cited

U.S. PATENT DOCUMENTS

| 6,226,409 | B1 * | 5/2001 | Cham et al. | 382/228 |
|---|---|---|---|---|
| 6,445,819 | B1 * | 9/2002 | Kinjo | 382/173 |
| 6,639,998 | B1 * | 10/2003 | Lee et al. | 382/103 |
| 6,816,611 | B1 | 11/2004 | Hagiwara et al. | |
| 7,092,569 | B1 * | 8/2006 | Kinjo | 382/190 |
| 7,551,756 | B2 * | 6/2009 | Chupeau et al. | 382/118 |
| 7,639,281 | B2 | 12/2009 | Sudo | |
| 7,809,162 | B2 * | 10/2010 | Steinberg et al. | 382/103 |
| 7,912,245 | B2 * | 3/2011 | Steinberg et al. | 382/103 |
| 2003/0209893 | A1 | 11/2003 | Breed et al. | |

(Continued)

FOREIGN PATENT DOCUMENTS

CN 1629717 A 6/2005

(Continued)

OTHER PUBLICATIONS

Japanese Office Action dated Mar. 10, 2009, and English translation thereof, issued in counterpart Japanese Application No. 2007-133353.

(Continued)

*Primary Examiner* — Manav Seth
(74) *Attorney, Agent, or Firm* — Holtz, Holtz, Goodman & Chick, PC

(57) ABSTRACT

An image pickup device can effectively detect a face in accordance with an object without causing a user to do bothersome setting. A speed preference mode and a person-number preference mode both having different detection conditions of a face region are prepared beforehand as face detection modes. The user is caused to select a desired face detection mode, and minimum values of a face size set as detectable in a face detection and a maximum number of face regions to be detected are set to values corresponding to the face detection mode selected by the user. In a case where an image-pickup preparation is set by pressing a shutter key halfway, when the face detection mode is the speed preference mode, the mode is forcibly changed to the person-number preference mode.

6 Claims, 10 Drawing Sheets

U.S. PATENT DOCUMENTS

| | | |
|---|---|---|
| 2005/0111737 A1 | 5/2005 | Das et al. |
| 2005/0128221 A1 | 6/2005 | Aratani et al. |
| 2005/0238217 A1 | 10/2005 | Enomoto et al. |
| 2006/0203107 A1 | 9/2006 | Steinberg et al. |
| 2007/0041640 A1 | 2/2007 | Tabata et al. |
| 2008/0231715 A1* | 9/2008 | Endo ........................ 348/208.99 |
| 2008/0273097 A1* | 11/2008 | Nagashima .............. 348/231.99 |
| 2009/0179998 A1* | 7/2009 | Steinberg et al. .......... 348/222.1 |
| 2010/0188520 A1* | 7/2010 | In et al. ...................... 348/222.1 |
| 2011/0135167 A1* | 6/2011 | Imaoka ......................... 382/118 |
| 2011/0228135 A1* | 9/2011 | Nanu et al. ............... 348/231.99 |

FOREIGN PATENT DOCUMENTS

| | | |
|---|---|---|
| JP | 2000-048184 A | 2/2000 |
| JP | 2004-334836 A | 11/2004 |
| JP | 2006-018805 A | 1/2006 |
| JP | 2006-285944 A | 10/2006 |
| KR | 10-2004-0051336 A | 6/2004 |

OTHER PUBLICATIONS

Korean Office Action dated Sep. 29, 2009, and English translation thereof, issued in counterpart Korean Application No. 10-2008-0045596.

Chinese Office Action dated May 27, 2010, and English translation thereof, issued in counterpart Chinese Application No. 200810173701.X.

* cited by examiner

Xf = FACE DETECTION REGION SIZE (X PIXEL SIZE)
Yf = FACE DETECTION REGION SIZE (Y PIXEL SIZE)
$\Delta X$ = X SHIFT UNIT OF FACE DETECTION REGION ( Xf × 20%)
$\Delta Y$ = Y SHIFT UNIT OF FACE DETECTION REGION ( Yf × 20%)
(Xs, Ys)= START POINTS OF FACE DETECTION REGION
(Xe, Ye)= END POINTS OF FACE DETECTION REGION ( Xe=Xs+Xf, Ye=Ys+Yf )

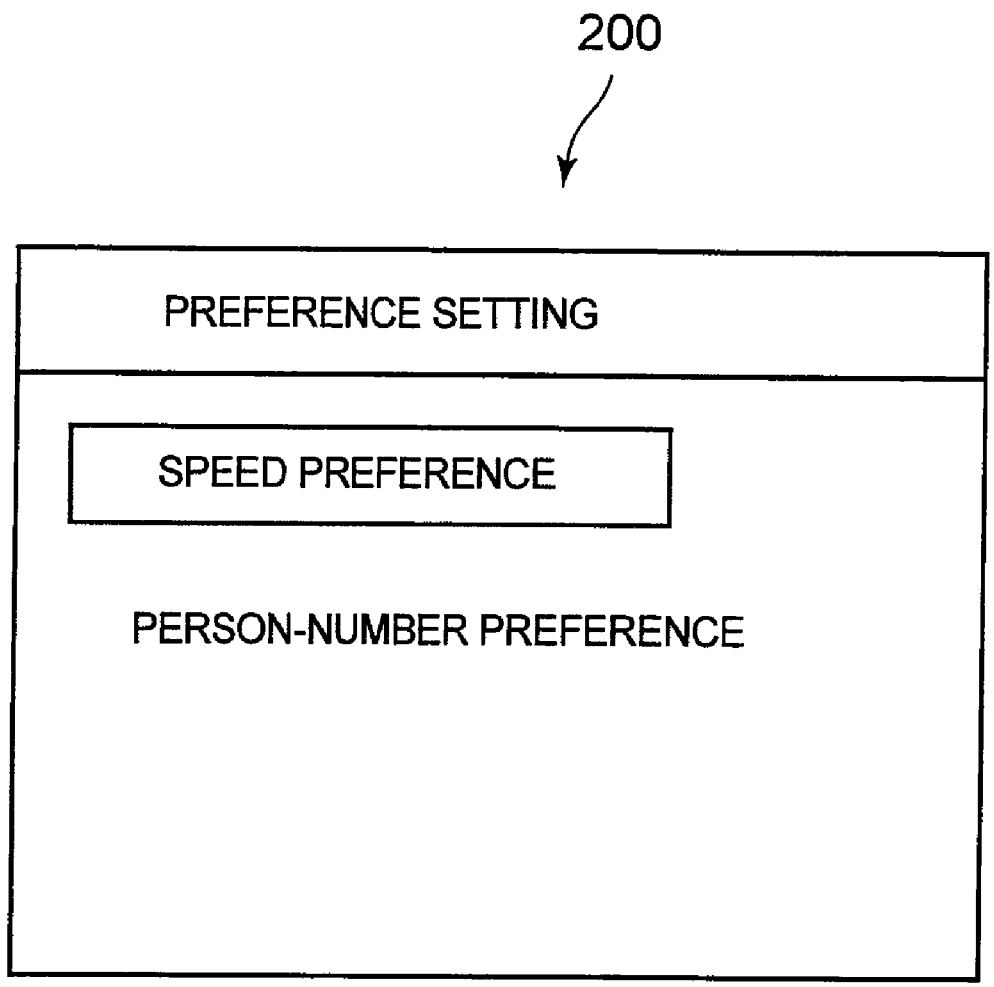

PROCESS SPEED FOR FACE SIZE

PROCESS SPEED FOR NUMBER OF PERSONS

IMAGE PICKUP DEVICE, FACE DETECTION METHOD, AND COMPUTER-READABLE RECORDING MEDIUM

This is a Divisional of U.S. application Ser. No. 12/152,890, filed May 16, 2008 now U. S. Pat. No. 8,019,129, which is based upon prior Japanese Patent Application No. 2007-133353, filed May 18, 2007, the entire contents of both of which are incorporated herein by reference.

BACKGROUND OF THE INVENTION

1. Field of the Invention

The present invention relates to an image pickup device like a digital camera having a face detection function of detecting the face of a person in an image, a face detection method and a computer-readable recording medium.

2. Description of the Related Art

Recently, digital cameras or digital video cameras, which pick up an image of an object using a CCD or a MOS type solid-state image sensor, have a face detection function of automatically detecting the face of a subject person when picking up a still image or a dynamic image. In general, such digital cameras or the like having a face detection function perform focus control and exposure control based on image information on a region of a detected face part (face region).

To speed up a process of detecting a face (detection of a face region) on an arbitrary image and to eliminate unnecessary detection processes, a technology of causing a user to set the respective maximum values of a process time, the number of persons to be detected, and a face area ratio (a ratio between an area of a process target image and a total area of a face region already detected), and of terminating a detection process when any one of such values becomes maximum, is known.

To cause digital cameras or the like to perform effective face detection with the foregoing technology, however, a user (photographer) needs a bothersome operation of setting plural parameters which set down a face detection operation, such as a process time, the number of persons to be detected, and a face area ratio, when picking up an image.

SUMMARY OF THE INVENTION

The present invention has been made in view of the foregoing circumstance, and it is an object of the invention to provide an image pickup device, a face detection method and a computer-readable recording medium which enable an effective face detection in accordance with an object without causing a user to do bothersome setting.

To achieve the object, an image pickup device according to the first aspect of the invention comprises: an image pickup unit which picks up an object; and a face detection unit which detects a face region from the object image picked up by the image pickup unit in accordance with a value of at least one parameter which corresponds to respective plural face detection modes set beforehand and which defines a detection condition of a face region.

According to the second aspect of the invention, a face detection method for detecting a face region from an object image picked up by an image pickup unit, comprises: a step of selecting any one of plural face detection modes as an operation mode in detecting a face region; and a step of detecting a face region from the object image picked up by the image pickup unit in accordance with values of a first parameter and a second parameter, the first parameter and the second parameter corresponding to a selected face detection mode, and defining a detection condition of a face region.

According to the third aspect of the invention, a face detection method for detecting a face region from an object image picked up by an image pickup unit, comprises: a step of repeating an detection operation of a face region from the object image in a first face detection mode, and acquiring predetermined detection information on a detection condition in a second face detection mode having a different detection condition of a face region from the first face detection mode while repeating the detection operation in the first face detection mode; and a step of changing over a detection operation mode of a face region from the object image to the second face detection mode when a content of the predetermined detection information satisfies the detection condition in the second face detection mode.

According to the fourth aspect of the invention, a computer-readable recording medium recording a face detection control program that allows a computer of an image processing device having a face detection function of detecting a face region from an object image to execute: a process of selecting any one of plural face detection modes set beforehand as an operation mode in detecting a face region; and a process of detecting a face region from the object image in accordance with values of a first parameter and a second parameter, the first parameter and the second parameter corresponding to the selected face detection mode, and defining a detection condition of a face region.

According to the fifth aspect of the invention, a computer-readable recording medium recording a face detection control program that allows a computer of an image processing device having a face detection function of detecting a face region from an object image to execute: a process of repeating a detection operation of a face region from the object image in a first face detection mode, and of acquiring predetermined detection information on a detection condition in a second face detection mode having a different detection condition of a face region from the first face detection mode while repeating the detection operation in the first face detection mode; and a process of changing over a detection operation mode of a face region from the object image to the second face detection mode when a content of the acquired predetermined detection information satisfies the detection condition in the second face detection mode.

According to the invention, it becomes possible to do effective face detection according to an object without causing a user to do bothersome settings.

BRIEF DESCRIPTION OF THE DRAWINGS

These objects and other objects and advantages of the present invention will become more apparent upon reading of the following detailed description and the accompanying drawings in which:

FIG. 7 is a diagram showing a mode selection screen;

DETAILED DESCRIPTION OF THE PREFERRED EMBODIMENTS

An explanation will be given of the embodiments of the invention in detail with reference to the accompanying drawings. In the embodiments, an explanation will be given of a case where an image pickup device of the invention is constituted by a digital camera.

First Embodiment

Figure 1:
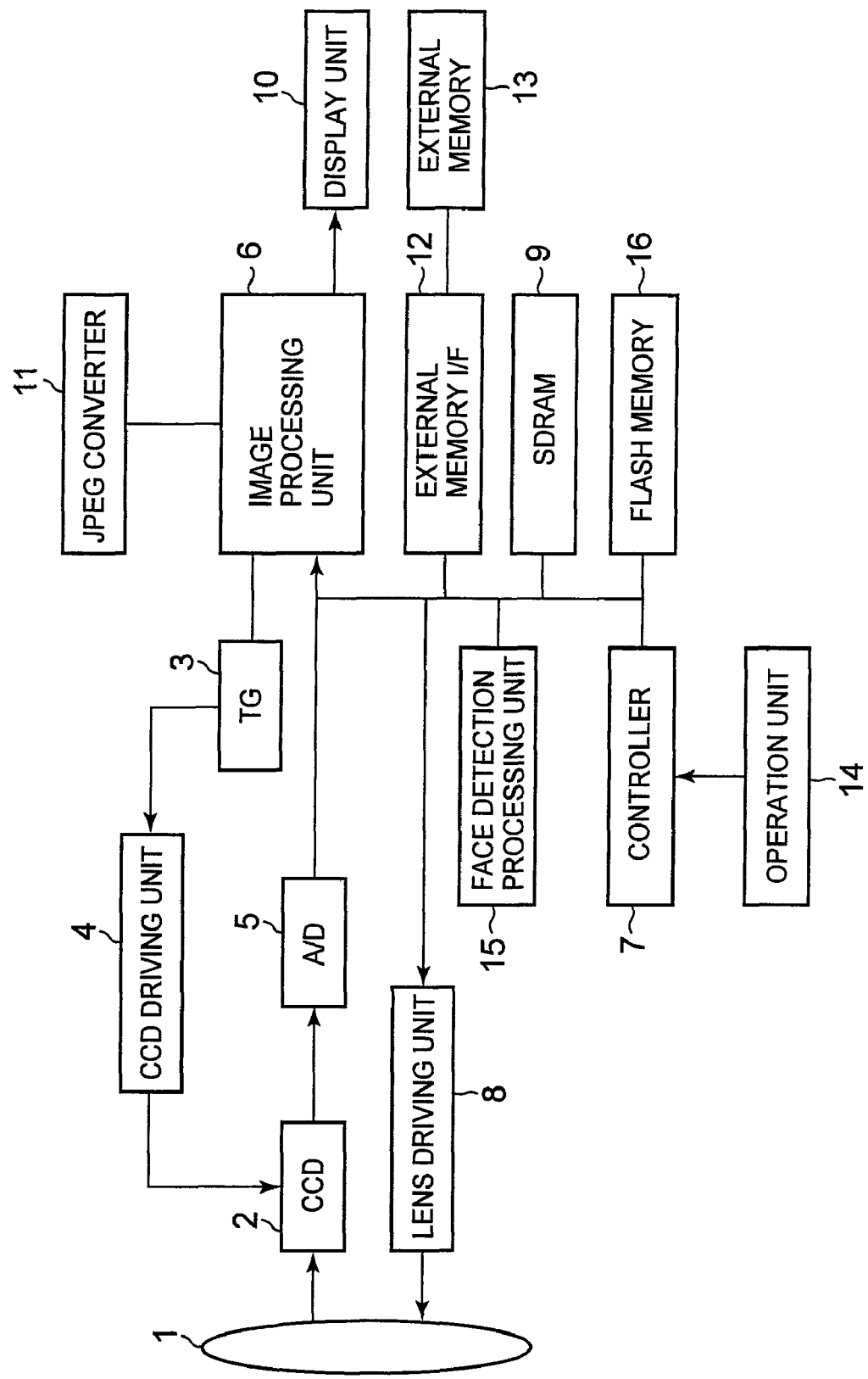
FIG. 1 is a block diagram showing the structure of a digital camera common to the individual embodiments of the invention.

The first embodiment of the invention will be explained first. FIG. 1 is a block diagram showing the general structure of a digital camera according to the embodiment. The digital camera has functions of AE (automatic exposure), AF (auto focus), and face detection, and generally comprises the following individual units.

That is, the digital camera has a CCD 2 which performs photoelectric conversion on an optical image of an object imaged by an optical system 1, and outputs an imaging signal. The CCD 2 is driven by a drive signal generated by a CCD driving unit 4 in accordance with a timing signal generated by a timing generator (TG) 3. The output signal of the CCD 2 is converted into a digital signal by an A/D converter 5, and is transmitted to an image processing unit 6.

The optical system 1 has a focus lens and a lens motor for moving the focus lens on an optical axis. The lens motor is driven by a drive signal generated by a lens driving unit 8 in accordance with an instruction from a controller 7. Accordingly, the focus lens has a position controlled on the optical axis.

The image processing unit 6 performs a RGB interpolation process of generating color component data (RGB data) on R, G, B for each pixel on an imaging signal undergone A/D conversion, a YUV conversion process of generating YUV data having a brightness signal (Y) and a color-difference signal (U, V) from the RGB data for each pixel, and a digital signal process for improving an image quality, such as auto white balancing or contour enhancing. The YUV data converted through the image processing unit 6 is successively stored in an SDRAM 9.

The digital camera further has a display unit 10 comprised of a liquid crystal monitor and a drive circuit thereof. In a recording mode for image pickup, the YUV data stored in the SDRAM 9 is converted into a video signal through the image processing unit 6 every time the SDRAM 9 stores one frame of data pieces. Thereafter, the converted video signal is displayed as a through image on the screen of the display unit 10 (liquid crystal monitor). In picking up an image under the recording mode, a JPEG converter 11 compresses and encodes image data temporarily stored in the SDRAM 9 in the JPEG format, and the compressed and encoded image is recorded as a still image file in an external memory 13, which comprises, for example, various kinds of memory cards, through an external memory I/F 12.

The still image file recorded in the external memory 13 is arbitrarily read out in accordance with a selection operation of a user in a reproducing mode. The read-out still image file is expanded by the JPEG converter 11, and is extracted as YUV data in the SDRAM 9. Thereafter, the YUV data is displayed as a still image on the display unit 10.

An operation unit 14 includes a plurality of keys, such as a power key, a mode changing key for changing over a basic operation mode of the digital camera between the recording mode and the reproducing mode, a MENU key, and a shutter key. Each key has an operational status scanned by the controller 7 as needed. Note that the shutter key has a so-called half shutter function of enabling a user to operate the shutter key in two stages through a half-pressed position for a preliminary image pickup and a full-pressed position for instructing an actual image pickup operation.

A face detection-processing unit 15 detects a face part having a similar characteristic to model patterns relating to a face of a person, such as a contour and a color prepared (stored) beforehand, on image data of one frame (hereinafter, frame image) generated by the image processing unit 6. Further, the face detection processing unit 15 creates coordinate information on a region corresponding to a detected face part (hereinafter, face region), and transmits the coordinate information to the controller 7. More specifically, the face detection processing unit 15 comprises a frame memory for temporarily storing the frame image, an image processing circuit for executing various image processes necessary for a face detection operation, and a plurality of registers for storing parameters used in a face detection operation.

In the embodiment, set as operation modes (face detection modes) of the face detection processing unit 15 in detecting a face region are a speed preference mode and a person-number preference mode having different conditions for detecting a face region. The face detection processing unit 15 executes a face detection process in accordance with a face detection mode. The kind of the face detection mode can be arbitrarily changed by the user.

The controller 7 comprises a CPU and peripheral circuits, and the like, controls the individual units of the digital camera, and performs AE control based on brightness information included in an imaging signal, AF control through a contrast detection scheme, and face detection control, and the like. Various kinds of programs for causing the controller 7 to do such controls and various data necessary for respective controls are stored in a flash memory 16 which is a nonvolatile memory where rewriting of stored data is possible.

Figure 2:
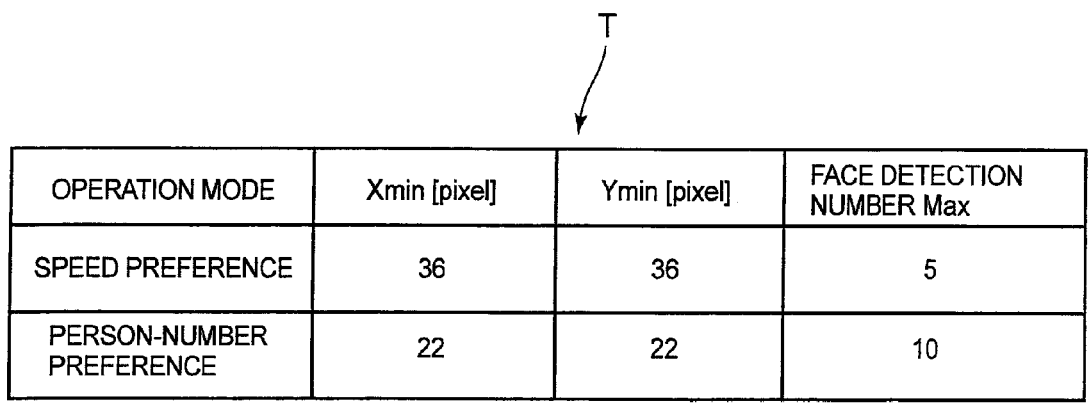
FIG. 2 is a conceptual diagram for a preference setting table.

In the embodiment, the flash memory 16 stores various data necessary for embodying the invention, in addition to the programs to be run by the controller 7. The flash memory 16 further stores setting information or the like on various functions of the digital camera set by the user. FIG. 2 is a conceptual diagram showing a preference setting table T stored in the flash memory 16. The preference setting table T indicates setting parameters corresponding to the face detection modes (speed preference mode and person-number preference mode). The setting parameters indicated in the preference setting table T are minimum face sizes detectable through a face detection, i.e., an image size Xmin in a horizontal direction which is the minimum value of a face size, an image size Ymin in a vertical direction, and a maximum number of faces to be detected, i.e., a face Max which is the maximum value of the number of detected faces. The controller 7 sets the setting parameters indicated in the preference setting table T as initial values in the registers of the face detection processing unit 15.

In the face detection modes, the speed preference mode is a mode which sets a preference (importance) for a processing speed in a face detection, and the person-number preference mode is a mode which sets a preference (importance) for the number of faces to be detected, i.e., a detailed face detection. Values of the setting parameters corresponding to both modes are values in accordance with the preference contents (condition of detecting a face region) of the respective modes. That is, the face Max which is the maximum value of the number of faces to be detected is "5" in the speed preference mode, and is "10" in the person-number preference mode. Moreover, the face size (Xmin, or Ymin) which is the minimum value of a face size is indicated by a percentage (N %) when the size of a frame image in the vertical direction is taken as 100% (see, FIG. 6A), and is "16%" in the speed preference mode, and is "10%" in the person-number preference mode. Note that an image size shown in FIG. 2 (36 pix, 22 pix) is an expedient value corresponding to an explanation of a specific operational content relating to a face detection to be discussed later.

In the embodiment, the values of the above-explained setting parameters are decided in view of the following points. That is, in general, in a face detection, the number of persons in an image subjected to a detection (hereinafter, frame image) and a size of a face of a person vary. Accordingly, a face present in a frame image (face region) is detected while gradually changing the size of a face to be detected from a small size to a large size. At this time, a process speed necessary for a cycle of face detection has an intimate relationship between the number of faces to be detected (number of detected faces) and a largeness of a face (face size).

Figure 8A:
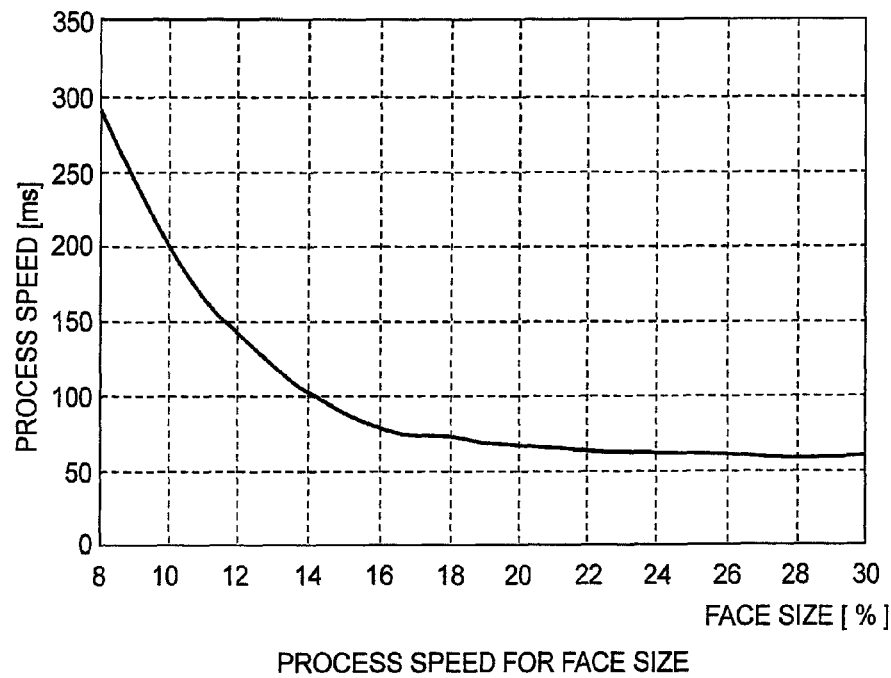
FIG. 8A is a process-speed characteristic diagram showing a relationship between a process speed necessary for a cycle of face detection and a size of a face to be detected.
Figure 8B:
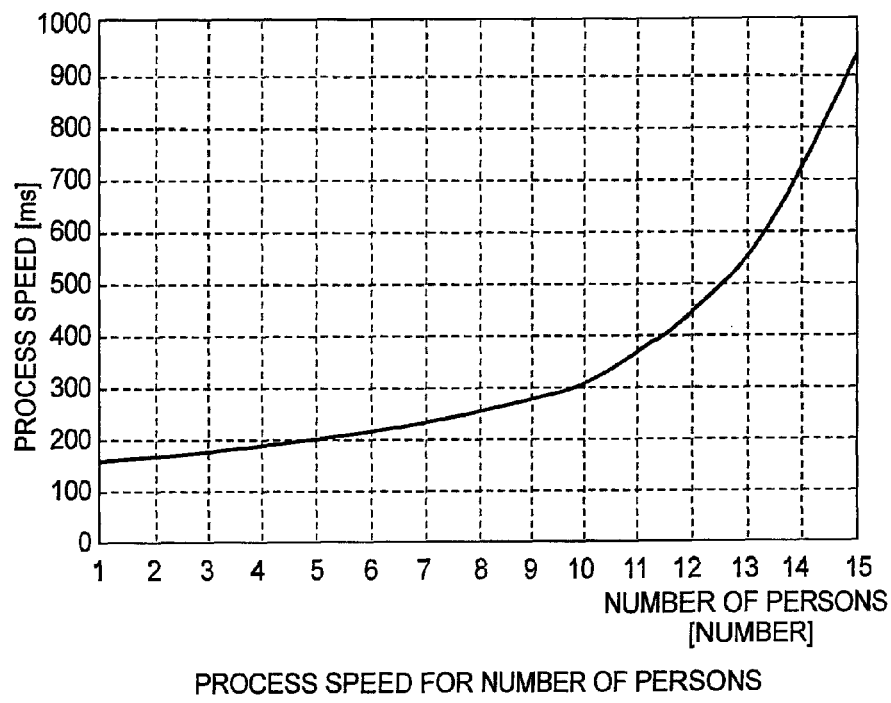
FIG. 8B is a process-speed characteristic diagram showing a relationship between a process speed necessary for a cycle of face detection and the number of faces to be detected (the number of persons)

FIG. 8A is a diagram showing a process speed (time) for a face size in a case where five persons are present in a frame image and the face sizes of the respective persons are same. A process speed necessary for a cycle of face detection becomes slow as a smaller face is to be detected, and in a case where a large face more than or equal to some extent is to be detected, the difference in the largeness of faces hardly affects to a process speed. FIG. 8B is a diagram showing a process speed for the number of faces to be detected in a case where the sizes of respective faces present in a frame are all 10 percent. A process speed necessary for a cycle of face detection becomes fast as the number of faces to be detected becomes small. Note that process speeds shown in the figures are expedient speeds.

A process speed necessary for a cycle of fade detection relates to a-largeness of a face to be detected and the number thereof, i.e., a largeness of a region subjected to a pattern matching, and the number of those regions. That is, the larger the size of a detectable face is, the larger a region subjected to a pattern matching becomes, and the number thereof becomes small. As the size of a detectable face becomes small, a region subjected to a pattern matching becomes small, and the number of those regions becomes large. Accordingly, the number of detecting whether an image of a target region is a face or not increases, thereby dramatically reducing a process speed.

As explained above, a process speed necessary for a cycle of face detection relates to a largeness of a face to be detected (face size) and the number of faces (number of detected faces). In addition, a process speed also intimately relates to the size of a face present in a frame image and the number of persons. That is, in a case where a face present in a frame image is large, even if faces are densely present, the number of faces which can be present in a frame image is limited.

Therefore, in detecting a smaller face, the number of detectable faces should be large, but in contrast, in detecting a large face only, the number of detectable faces can be reduced. In view of the foregoing points, according to the embodiment, the face Max (maximum value of the number of faces to be detected) is set to "5" and the face size (minimum value of detection size) is set to "16 percent" as values of setting parameters corresponding to the speed preference mode. The face Max is set to "10" and the face size is set to "10 percent" as values of the setting parameters corresponding to the person-number preference mode.

Next, the operation of the digital camera having the foregoing structure relating to a face detection will be explained. First, a basic operation will be explained. In the digital camera, when a face detection function is enabled in an image-pickup standby state in the recording mode, the controller 7 causes the face detection processing unit 15 to perform face detection on an image data (frame image) of an object acquired through an image-pickup operation at a predetermined frame rate. Every time a face detection operation of the face detection processing unit 15 is completed, the controller 7 transmits a new frame image acquired right after the completion of the face detection operation to the face detection processing unit 15. As the face detection processing unit 15 receives the new frame image from the controller 7, the face detection processing unit 15 executes a face detection process at all times asynchronously with the frame rate. In this case, the face detection processing unit 15 sets almost all region of the frame image other than an outer circumferential part as a face searching region, and performs a face detection process on the face searching region. In the following explanation, as a matter of convenience, let us suppose that the size of the face searching region is 290 pixels by 220 pixels (see, FIG. 5).

Figure 3:
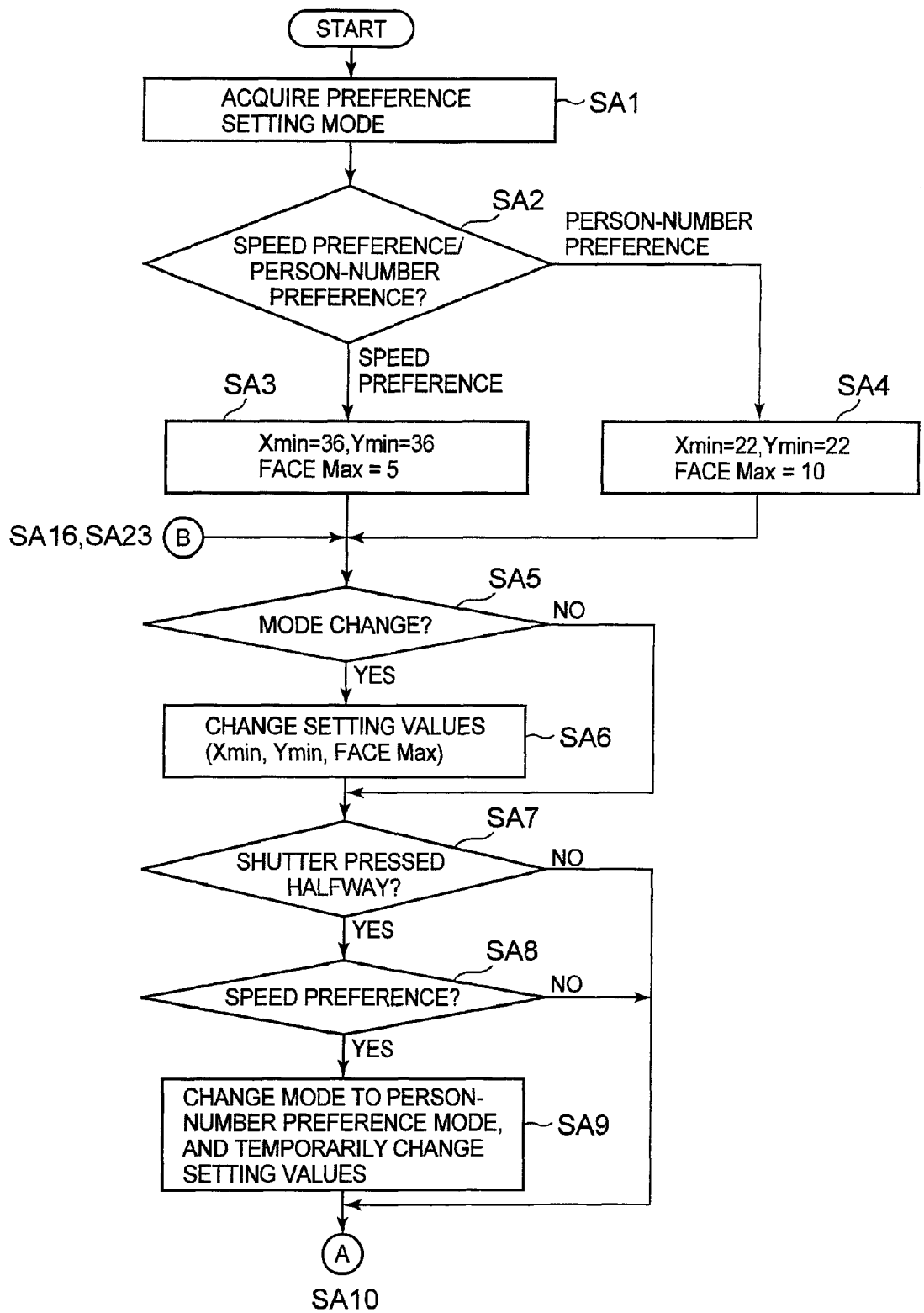
FIG. 3 is a flowchart showing the operational contents of a face detection according to a first embodiment.

A specific operation will be explained with reference to the flowcharts of FIGS. 3 and 4. As shown in FIG. 3, when the face detection function is enabled in the recording mode or when the recording mode is set with the face detection function being enabled, the controller 7 in the digital camera acquires setting information on the kind of the face detection mode set at this time (e.g., the kind of the face detection mode set when the face detection function was used at a previous time) from the flash memory 16 (step SA1).

Thereafter, the controller 7 determines which one of the face detection modes between the speed preference mode and the person-number preference mode is set (step SA2). Next, the controller 7 reads out the setting parameters corresponding to the set mode from the preference setting table T (see, FIG. 2), and sets those values to the face detection processing unit 15 as initial values for a face detection operation. That is, when it is determined that the "speed preference mode" is set, the controller 7 sets the values "36, 36" as the face sizes (Xmin, Ymin), and sets the maximum value of the number of faces to be detected (face Max) to "5" (step SA3). On the other hand, when it is determined that the "person-number preference mode" is set, the controller 7 sets the face sizes (Xmin, Ymin) to "22, 22", and sets the maximum value of the number of faces to be detected (face Max) to "10" (step SA4).

Afterward, when there is no operation of changing over the face detection mode and a shutter key half-press operation by the user (steps SA5, SA7: NO), every time the controller 7 transmits a frame image to the face detection processing unit 15, the face detection processing unit 15 repeatedly performs face detection operations through the routines from steps SA10 to SA23 shown in FIG. 4. FIG. 5 is an explanatory diagram showing a face searching region 101 in a frame image 100 and parameters used in a face detection operation.

Figure 4:
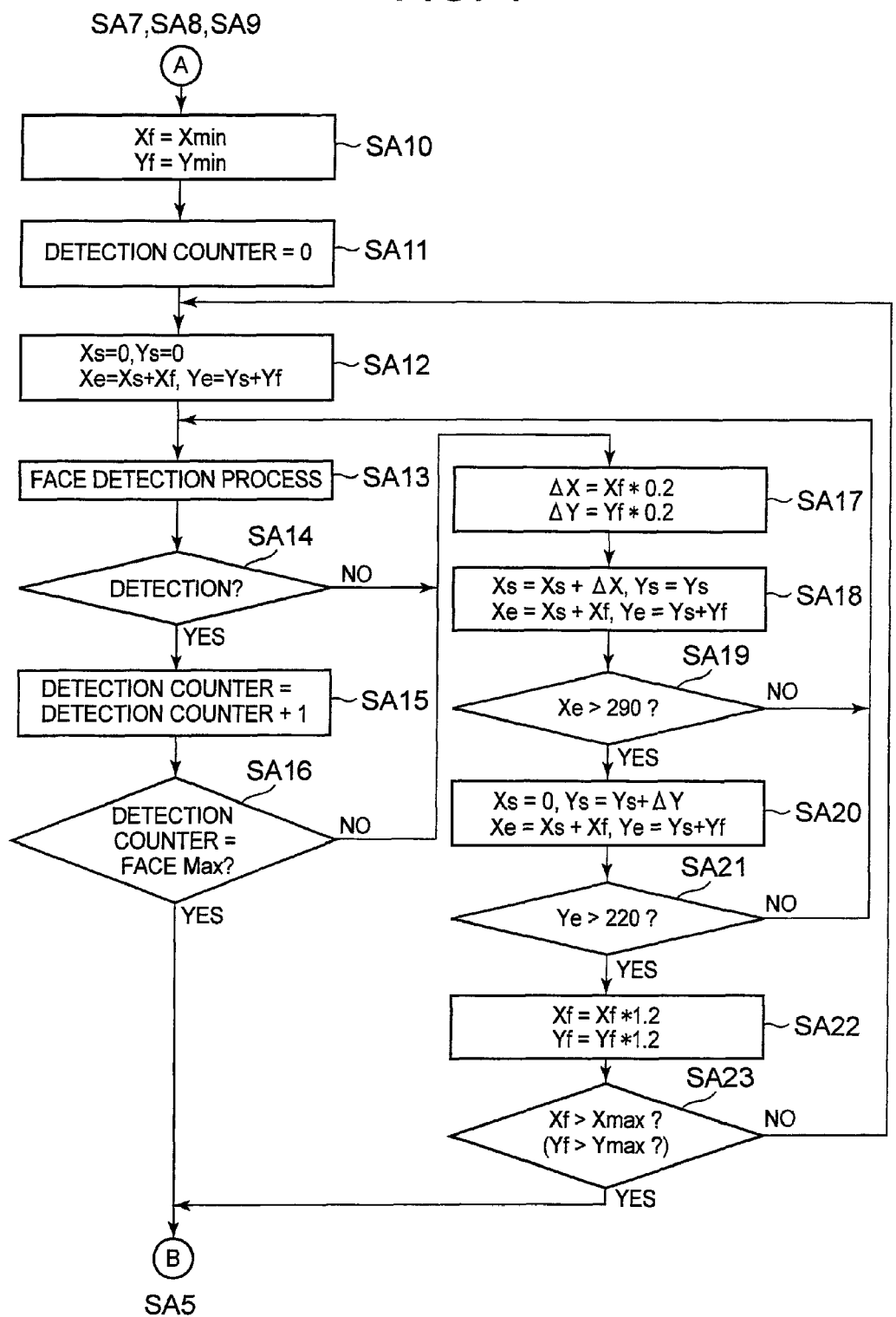
FIG. 4 is a flowchart continuous from FIG. 3.
Figure 5:
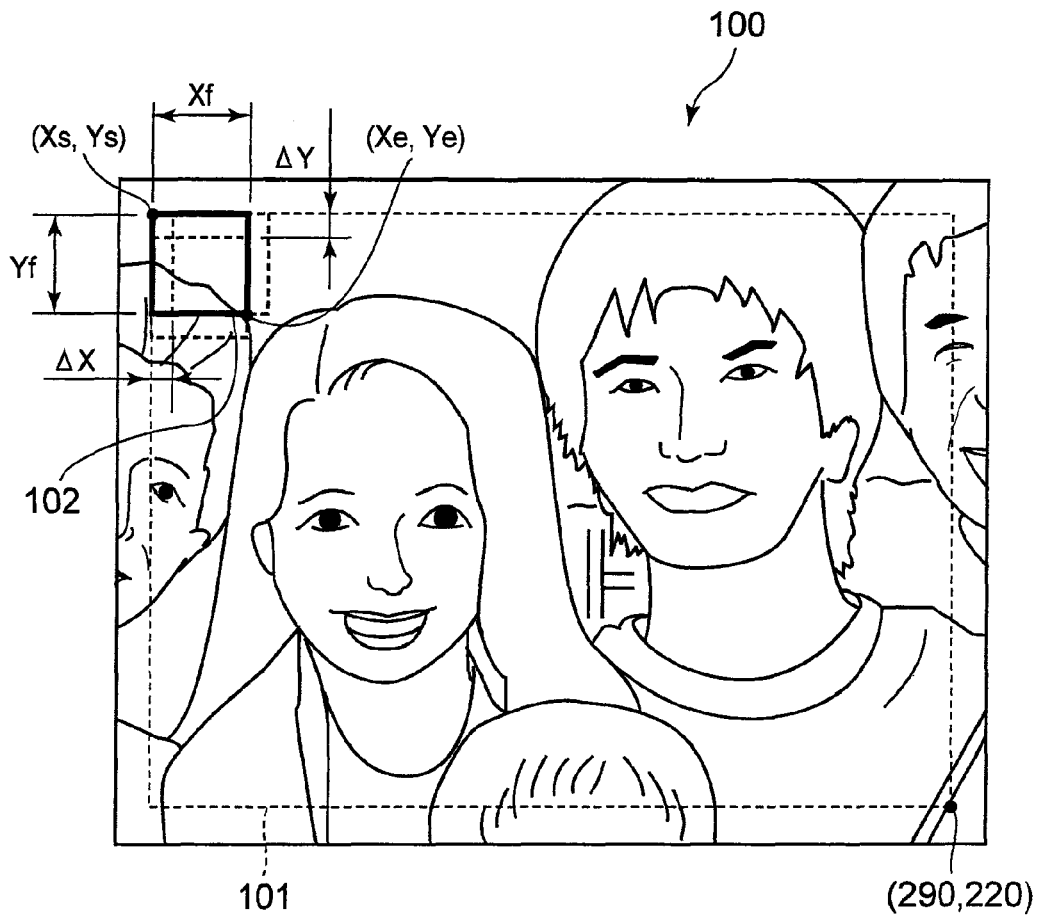
FIG. 5 is an explanatory diagram showing a face searching region in a frame image and parameters used in a face detection operation.

As shown in FIG. 4, first, the face detection processing unit 15 sets sizes Xf, Yf of a face detection region 102 subjected to a pattern matching to the initial values (Xmin, Ymin) set by the controller 7 (step SA10). The face detection processing unit 15 sets the value of a detection counter to "0" (step SA11). Further, the face detection processing unit 15 sets the value's of start points Xs, Ys of the face detection region 102 to "0", and sets the values of end points Xe, Ye of the face detection region 102 to values corresponding to the start points Xs, Ys and the sizes Xf, Yf (step SA12). In this manner, the face detection processing unit 15 executes a parameter initialization process. Note that the start points Xs, Ys and the end points Xe, Ye are coordinates within the face searching region 101 in the frame image 100. Thereafter, the face detection processing unit 15 executes a face detection process through a pattern matching on the face detection region 102 having the sizes Xf, Yf (step SA13). The face detection processing unit 15 repeats the same face detection process through the following procedures while updating the position and size of a face detection region 102.

First, the face detection processing unit 15 sets shift units ΔX and ΔY of the face detection region 102 in the X direction and the Y direction to 20% of the sizes Xf, Yf of the face detection region at the time (step SA17). Thereafter, the face detection processing unit 15 updates the start point Xs and the end point Xe to shift the face detection region 102 by what corresponds to the shift unit ΔX in the X direction (step SA18). Until the end point Xe in the X direction crosses a coordinate position of the right end of the face searching region 101 (in the embodiment, 290) (step SA19: NO), the face detection processing unit 15 executes a face detection process every time the face detection region 102 is shifted in the X direction through the foregoing process.

Every time the end point Xe of the face detection region 102 in the X direction crosses the right end coordinate position (290) of the face searching region 101 (step SA19: YES), the face detection processing unit 15 shifts the face detection region 102 in the Y direction by what corresponds to the shift unit ΔY, and updates the start points Xs, Ys, and the end points Xe, Ye to move the position of the face detection region 102 in the X direction to the left end (step SA20). The face detection processing unit 15 repeats shifting in the X direction from a new position in the Y direction, and executes a face detection process every time the face detection region 102 is shifted. In this manner, the face detection processing unit 15 repeatedly shifts the face detection region 102 until a new end point Ye in the Y direction crosses over the bottom end coordinate position (in the embodiment, 220) of the face searching region 101 (step SA21: NO). Namely, the face detection processing unit 15 repeats the face detection process while shifting the face detection region 102 little by little (by the shift units ΔX, ΔY) from the left to the right, and the top to the bottom of the face searching region 101.

Every time the end point Ye of the face detection region 102 in the Y direction crosses over the bottom end coordinate position of the face searching region 101 (step SA21: YES), the face detection processing unit 15 enlarges the sizes Xf, Yf of the face detection region 102 in the X direction and the Y direction at that time to sizes of 1.2 times (step SA22). Afterward, the face detection processing unit 15 repeats the face detection process while shifting the face detection region 102 of a new size (Xf, Yf) from the left to the right, top to the bottom of the face searching region 101 as explained before (step SA23: NO).

Further, every time a face is detected while the foregoing face detection process is repeated (step SA14: YES), the face detection processing unit 15 counts up the value of the detection counter (step SA15). When the value of the detection counter, i.e., the number of faces detected reaches the maximum value (face Max) (step SA16: YES), or when the size (Xf, Yf) of the face detection region 102 set in the step SA22 exceeds the maximum size (Xmax, Ymax) set beforehand (step SA23: YES), the face detection processing unit 15 terminates the face detection operation to the frame image 100. The process returns to the step SA5 in FIG. 3.

When there is no operation of changing over the face detection mode or a shutter key half-press operation (steps SA5, SA7: NO), the face detection operation from the step SA10 to the step SA23 shown in FIG. 4 is repeatedly performed on a new frame image.

Figure 6A:
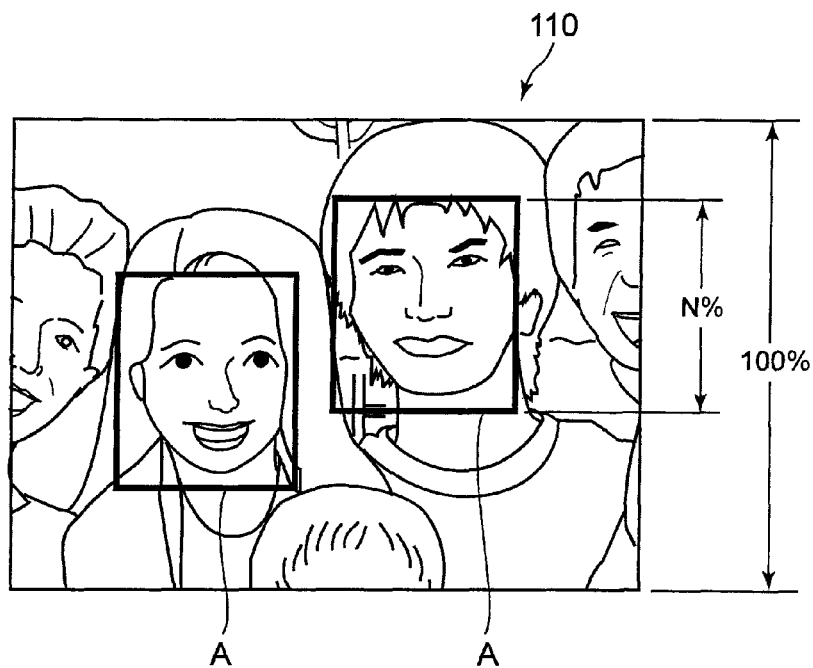
FIG. 6A is a diagram showing an example of a through image with face detection frames being displayed.
Figure 6B:
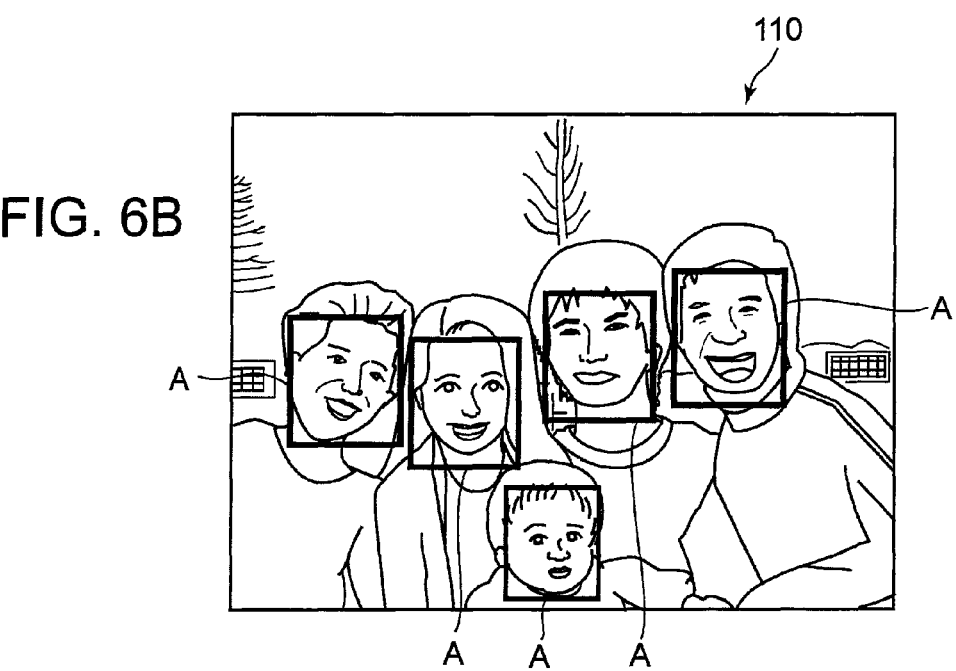
FIG. 6B is a diagram showing an example of a through image with face detection frames being displayed.

It is not shown in the flowcharts, but when counting up the value of the detection counter in the step SA15 of the face detection operation, the face detection processing unit 15 transmits coordinate information (start points Xs, Ys and end points Xe, Ye) of the face detection region 102 at that time to the controller 7. The controller 7 successively displays a face detection frame indicating a face region overlapped on a through image based on the transmitted coordinate information. FIGS. 6A and 6B are diagrams showing an example of a through image 110 with a face detection frame A being displayed at a time when the face detection operation to a frame image, i.e., the face detection process of a cycle is completed.

The face detection frame A is displayed by the controller 7 synthesizing OSD (On Screen Display) data of the face detection frame A with YUV data of a through image stored in the SDRAM 9. A face region detected by the face detection processing unit 15 is used as, for example, a photometric region when the controller 7 performs AE control, and an acquisition region of a contrast value (AF evaluation region) when the controller 7 performs AF control.

As shown in FIG. 3, when the user changes over the face detection mode (step SA5: YES), the controller 7 changes the setting values set for the face detection processing unit 15, i.e., the value of face sizes (Xmin, Ymin) and the maximum value of the number of faces to be detected (face Max) to values corresponding to a new mode (speed preference mode, or person-number preference mode) (step SA6). Thereafter, the face detection processing unit 15 executes the foregoing face detection operation based on the changed setting values.

When the user operates a predetermined key for setting (changing) a mode, the controller 7 displays a mode selection screen exemplified in FIG. 7 on the display unit 10 in response to the operation of the user. As the user selects a face detection mode (speed preference mode or person-number preference mode) through an operation like moving a cursor, the controller 7 sets the mode selected by the user as a new face detection mode.

Further, when the user presses the shutter key halfway (step SA7: YES), the controller 7 determines whether the face detection mode set at the time is the speed preference mode or not (step SA8). When determining that the speed preference mode is set (step SA8: YES), the controller 7 causes the face detection processing unit 15 to stop the face detection operation at the time, and temporarily changes the values of the face sizes (Xmin, Ymin) and the maximum value (face Max) of the number of faces to be detected to the values corresponding to the person-number preference mode (step SA9). Thereafter, while the shutter key is being pressed halfway, the controller 7 causes the face detection processing unit 15 to perform the face detection operation to a frame image in the person-number preference mode. It is not illustrated in the flowchart, but when the setting values are temporarily changed to the values corresponding to the person-number preference mode, the controller 7 sets back the setting values to the setting values for the speed preference mode at a time when the half-pressing of the shutter key is released. Afterward, in the image-pickup standby state, the operations from the step SA5 to the step SA23 are repeated while the face detection function is being enabled.

In the foregoing embodiment, when the speed preference mode is set as the face detection mode, the maximum value of the number of detected faces (face Max) is set to "5", and the initial value of the size of the face detection region 102 is set to "36, 36" (16% in face size). When the person-number preference mode is set, the maximum value of the number of detected faces (face Max) is set to "10", and the initial value of the size of the face detection region 102 is set to "22, 22" (10% in face size).

Therefore, when the speed preference mode is set, the face detection performances, such as the number of faces to be detected (the number of detected faces) and the face size, are small in comparison with the person-number preference mode, but a process speed necessary for a cycle of face detection becomes fast, so that the face detection operation ensures a high responsiveness. Namely, when an angle of view changes or when a person in an angle of view moves, it is possible to promptly move the face detection frame A (see, FIGS. 6A, 6B) following to such a change or such a movement. In contrast, when the person-number preference mode is set, the responsiveness thereof is less than that of the speed preference mode, but it is possible to detect a small face far away, and it is possible to detect faces of a large number of persons. That is, it is possible to do face detection in detail.

As explained above, according to the digital camera of the embodiment, the user (photographer) can cause the digital camera to perform efficient face detection corresponding to specific contents of an object, such as the number of persons in an angle of view, and a face size, by just selecting the kind of the face detection mode.

In a case where the user individually sets the parameters, such as a detectable face size, and the number of detectable faces, it is necessary that the user should have a proficiency in setting of those parameters (combination of parameter values). For example, when the user wants to detect only a large face, it is desirable to reduce the number of faces to be detected (maximum number of persons). In a case where the user does not have a proficiency in setting of those parameters, but sets the maximum number of persons largely, this results in an achievement of an unintentional responsiveness. On the other hand, according to the digital camera of the embodiment, a user needs to only select the kind of the face detection mode, so that everyone can cause the digital camera to do efficient face detection in accordance with specific contents of an object.

During a period from when the shutter key is pressed halfway and until when the shutter key is released, the face detection mode is forcibly set to the person-number preference mode regardless of the kind of the face detection mode so far. Accordingly, most appropriate AF control and AE control are always performed through a detailed face detection operation in picking up an image.

Note that a change to the person-number preference mode through the foregoing half-pressing of the shutter key may be carried out temporarily only when the shutter key is pressed halfway. The foregoing effectiveness can be also achieved in this case.

In the foregoing embodiment, the face detection mode has the two kinds: the speed preference mode where a preference is given to a process speed in detecting a face; and the person-number preference mode where a preference is given to the number o face to be detected (detection of faces in detail), but the kinds of the face detection mode set beforehand may be greater than or equal to three. Individual face detection modes may have different conditions for detecting a face region by combining the values of greater than or equal to two parameters. That is, a mode which has a preference (importance) to an operational content other than a process speed in detecting a face and the number of faces to be detected may be set.

In a case where, for example, another mode in addition to the speed preference mode and the person-number preference mode is set as a face detection mode, like the foregoing embodiment, by setting a mode which has the highest detection precision of a face region in plural face detection modes during a period from when the shutter key is pressed halfway and until when the shutter key is released, further appropriate AF control and AE control are enabled in picking up an image.

Second Embodiment

Next, the second embodiment of the invention will be explained. The embodiment relates to a digital camera which automatically sets (changes) the foregoing face detection mode. The digital camera has the same basic structure as that of the first embodiment, but the flash memory 16 stores a program for causing the controller 7 to execute the following process.

Figure 9:
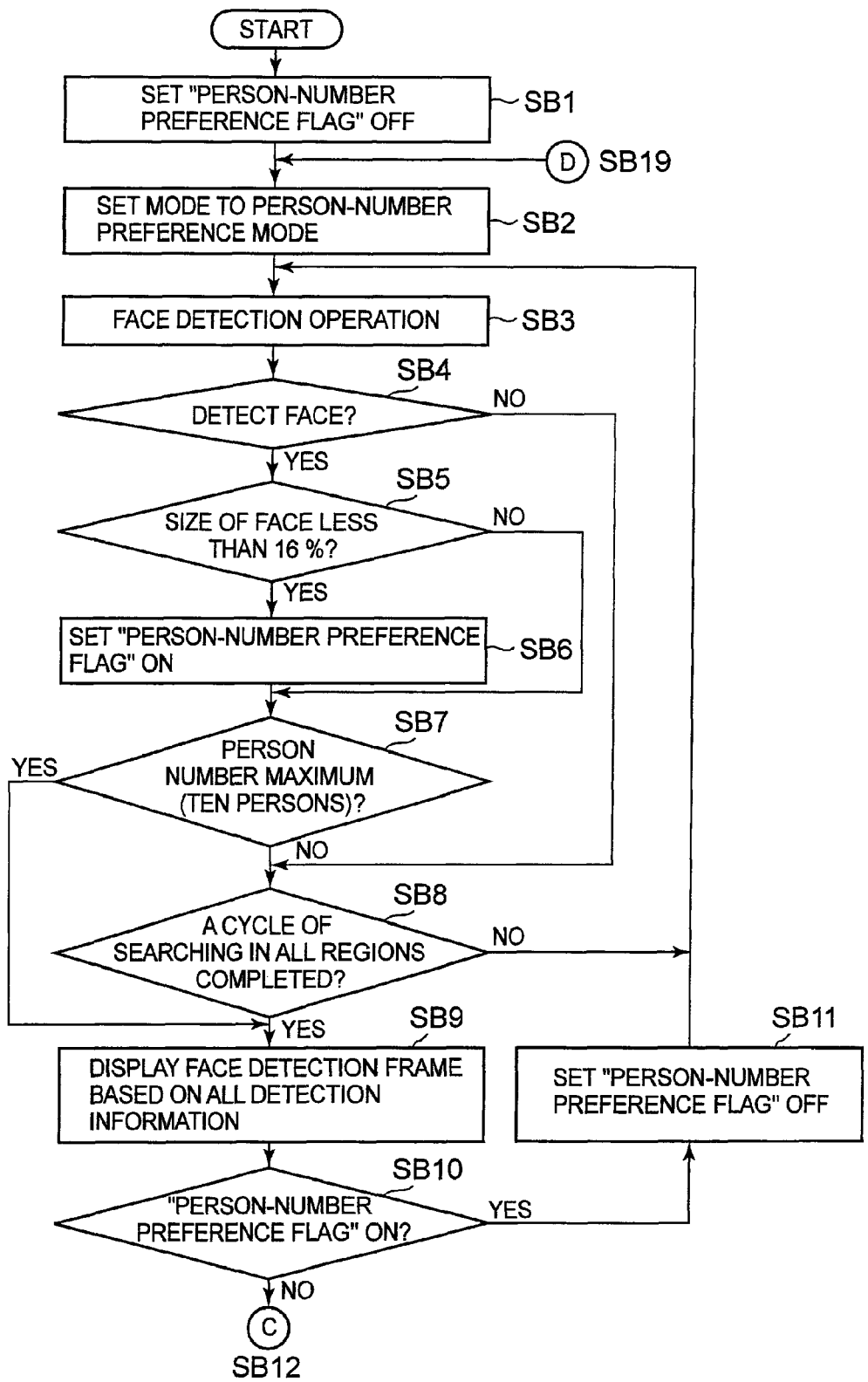
FIG. 9 is a flowchart showing the process of a face detection by a controller according to a second embodiment.
Figure 10:
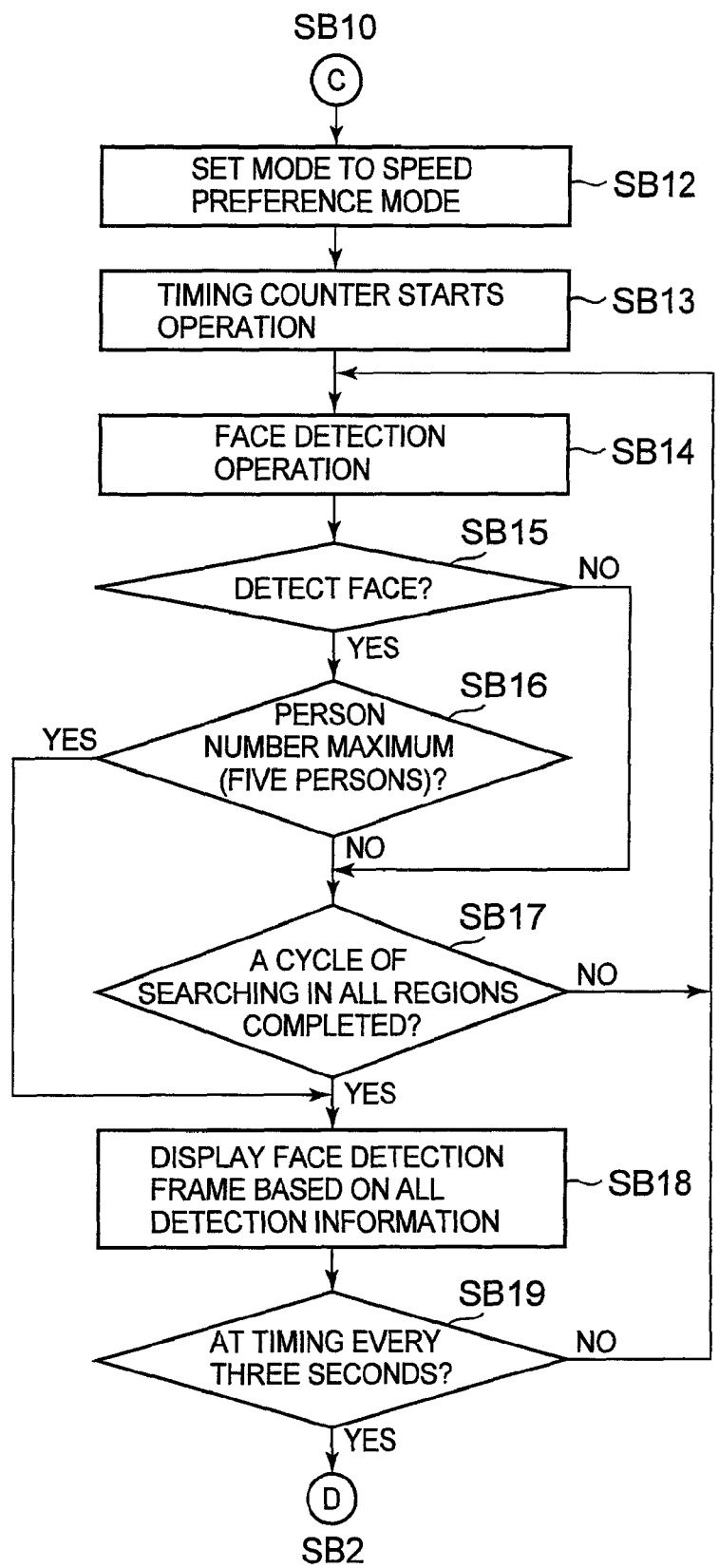
FIG. 10 is a flowchart continuous from FIG. 9.

The contents of the process by the controller 7 relating to a face detection will be explained with reference to the flowcharts of FIGS. 9 and 10. As shown in FIG. 9, as the face detection function is enabled in the recording mode or as the recording mode is set with the face detection function being set enabled, the controller 7 performs an initializing process of setting a person-number preference flag OFF (step SB1). Next, the controller 7 sets the person-number preference mode as the face detection mode. Namely, the controller 7 reads out the setting parameters corresponding to the person-number preference mode from the preference setting table T (see, FIG. 2), and set those values as initial values used for a face detection operation in the face detection processing unit 15 (step SB2). The controller 7 causes the face detection processing unit 15 to do the face detection operation like that of the first embodiment (step SB3).

Thereafter, until a cycle of face detection to a frame image is completed through the face detection processing unit 15 (step SB8: NO), every time the face detection processing unit 15 detects a face (step SB4: YES), the controller 7 determines whether or not the size of the detected face is less than 16% and whether or not the number of detected faces (number of detected faces) reaches the maximum, i.e., "10" which is the maximum value (face Max) in the person-number preference mode based on coordinate information (start points Xs, Ys, and end points Xe, Ye) of the face detection region 102 (see, FIG. 5) transmitted from the face detection processing unit 15 (steps SB5, SB7).

When it is determined that the size of the detected face is less than 16%, and when a relatively small face is detected in a frame image (step SB5: YES), the controller 7 sets the person-number preference flag in an ON state (step SB6).

When the number of detected faces reaches the maximum (step SB7: YES) or when the number of detected faces does not reach the maximum but a cycle of the face detection process is completed (step SB8: YES), the controller 7 displays one or plural face detection frames on a through image based on all coordinate information transmitted from the face detection processing unit 15 until that time (step SB9).

Subsequently, when the person-number preference flag is set ON (step SB10: YES), the controller 7 once sets back the person-number preference flag OFF (step SB11). Thereafter, the controller 7 returns the process to the step SB3, and causes the face detection processing unit 15 to perform the face detection process on a next frame image while keeping the face detection mode being in the person-number preference mode (step SB3). Namely, in a case where at least one face having a size less than 16% is included in one or plural faces detected in a most recent frame image, when the size of the detected face does not satisfy the detection condition of a face region in the speed preference mode, the controller 7 keeps the face detection processing unit 15 to perform the face detection process in the person-number preference mode. Therefore, it is possible to do effective face detection in accordance with the specific contents of an object.

In contrast, when the person-number preference flag is not set ON (step SB10: NO), as shown in FIG. 10, the controller 7 changes over the face detection mode from the person-number preference mode to the speed preference mode (step SB12). That is, in a case where the sizes of faces detected from a most recent frame is all greater than or equal to 16% in the person-number preference mode, the controller 7 changes over the face detection mode from the person-number preference mode to the speed preference mode. The controller 7 reads out the setting parameters corresponding to the speed preference mode from the preference setting table T (see, FIG. 2), and sets those parameters as initial values used for the face detection operation to the face detection processing unit 15. At the same time, the controller 7 starts a timing counter operation to acquire an operation timing every predetermined time (three seconds) after the change over of the face detection mode (step SB13). Next, the controller 7 causes the face detection processing unit 15 to do the face detection operation in the speed preference mode (step SB14).

Thereafter, until the face detection processing unit 15 completes a cycle of the face detection process to a frame image (step SB17: NO), every time the face detection processing unit 15 detects a face (step SB15: YES), the controller 7 determines whether or not the number of faces detected (number of detected faces) at the time reaches the maximum, i.e., whether or not the number of faces detected at the time reaches "five" which is the maximum value (face Max) of the speed preference mode (step SB16).

When the number of detected faces reaches the maximum value (step SB16: YES), or when the number of detected faces does not reach the maximum, but when a cycle of the face detection process is completed (step SB17: YES), the controller 7 displays one or plural face detection frames on a through image based on all coordinate information transmitted from the face detection processing unit 15 (step SB18).

Subsequently, when it is not an operation timing acquired every three seconds as explained above (step SB19: NO), the process returns to the step SB14. That is, the controller 7 causes the face detection processing unit 15 to perform the face detection process on a next frame image in the speed preference mode not changed as it is. Accordingly, it is possible to do effective face detection in accordance with an object.

In contrast, while repeating the foregoing process, when it becomes an operation timing acquired every three seconds (step SB19: YES), the process returns to the step SB2 in FIG. 9. The controller 7 changes over the face detection mode from the speed preference mode to the person-number preference mode. Thereafter, the controller 7 executes the process to the step SB10. When there is a change in the state of an object, such that any person in the angle of view moves away from the digital camera, or a person newly enters in the angle of view so that a relatively small size of a face less than 16% is detected after the face detection has been previously carried out through the person-number preference mode (step SB5: YES), the controller 7 sets the person-number preference flag ON (step SB6). By setting the person-number preference flag ON, the controller 7 can cause the face detection processing unit 15 to repeat the detailed face detection process in the person-number preference mode not changed as it is.

When no face having a relatively small size less than 16% is detected at all in the person-number preference mode carried out once every three seconds (steps SB5 to SB10), the controller 7 sets back the face detection mode to the speed preference mode (step SB12). Thereafter, the controller 7 causes the face detection processing unit 15 to repeat the fast-speed face detection process again.

As explained above, according to the embodiment, the kind of the face detection mode is automatically set. Thereby, it enables an effective face detection in accordance with the specific contents of an object, such as the number of persons in the angle of view, and the largeness of a face, without placing an operational load on the user (photographer) at all.

In addition, as the face detection mode is temporarily changed from the speed preference mode to the person-number preference mode, it is determined at all times whether or not a change to the person-number preference mode is necessary based on a result of face detection in the person-number preference mode. When it is determined that a change to the person-number preference mode is necessary, the face detection mode is automatically changed to the person-number preference mode, so that even if the specific contents of an object change at an arbitrary time, it is possible to cope with such a change promptly.

In the embodiment, predetermined detection information of the invention is a size of a face detected through the face detection operation in the person-number preference mode. The face detection mode is changed over to the speed preference mode in a case where the predetermined information satisfies the detection condition in the speed preference mode, but the face detection mode may be changed over as follows.

For example, in a case where the number of persons detected through the face detection operation in the person-number preference mode satisfies the detection condition of a face region in the speed preference mode, the face detection mode may be changed over to the speed preference mode. Furthermore, in a case where either one of the size of a face detected through the face detection operation or the number of detected faces in the person-number preference mode satisfies the detection condition of a face region in the speed preference mode, or both of the size of a face detected through the face detection operation or the number of detected faces in the person-number preference mode satisfy the detection condition of a face region in the speed preference mode, the face detection mode may be changed over to the speed preference mode. In particular, according to the latter case, it is possible to control the face detection mode which is further surely appropriate for the specific contents of an object.

Further, in the embodiment, the explanation has been given of the case where the face detection modes are the speed preference mode and the person-number preference mode, and the detection condition of a face region in each mode is based on the values of plural parameters, such as the size of a smallest detectable face (minimum value of a face size), and a maximum number of faces detectable (maximum value of the number of detected faces). The detection condition of a face region in each face detection mode, however, may be based on the value of a single parameter.

For example, each of the face detection modes may be a mode having a detection condition which is based on only the size of the smallest face detectable, or a mode having a detection condition which is based on the maximum number of faces should be detected, as long as individual modes have different detection condition of a face region.

The detection condition of a face region in each face detection mode is not limited to one which is based on a single or two parameter values, and may be one which is based on more than or equal to three kinds of parameters. In this case, however, the specific operation of automatically determining a necessity of changing the face detection mode, and of changing over the face detection mode as needed becomes complex, as the kinds of the face detection mode are large numbers.

In a case where a mode different from the foregoing speed preference mode and person-number preference mode is employed as a face detection mode, depending on a parameter deciding the detection condition of a face region in each mode, but the following operation may be applied. Namely, after the face detection mode is changed from one mode to the other mode, while a face detection is repeated through the other mode without temporarily changing the face detection mode to the one mode, it is determined at all times whether or not a change to the one mode is necessary based on predetermined detection information acquired through the face detection process. In a case where it is determined that a mode change is necessary, the face detection mode may be automatically changed over to the one mode from the other mode.

The explanation has been given of the digital camera having the face detection processing unit 15 which performs face detection on a frame image and acquires coordinate information on a face region in the first and second embodiments, but the invention is not limited to such a digital camera. For example, the invention can be applied to a digital camera having no face detection processing unit 15, and structured in such a way that a controller 7 performs face detection on a frame image and acquires coordinate information on a face region. Further, the explanation has been given of the case where the invention is applied to the digital camera having a general structure, but the invention is not limited to such a case, and can be applied to a digital camera built in another information device like a cellular phone, another image pickup device like a digital video camera, and another device like an image processing device as long as those have a face detection function.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An image pickup device comprising:
an image sensor which picks up an image of an object;
a face detection unit which detects a face region from an object image picked up by the image sensor, and has a first face detection mode and a second face detection mode as operation modes, the first face detection mode and the second face detection mode having a different detection condition for detecting a face region; and
a mode control unit which acquires predetermined detection information on the detection condition in the second face detection mode while the face detection unit repeats a detection operation of detecting a face region in the first face detection mode, and changes an operation mode of the face detection unit to the second face detection mode when a content of the acquired predetermined detection information satisfies the detection condition in the second face detection mode.

2. The image pickup device according to claim 1, wherein the mode control unit acquires predetermined detection information on the detection condition in the first face detection mode while the face detection unit repeats a detection operation of detecting a face region in the second face detection mode, and sets an operation mode of the face detection unit to the first face detection mode when a content of the acquired predetermined detection information satisfies the detection condition in the first face detection mode.

3. The image pickup device according to claim 1, wherein the mode control unit causes the face detection unit to perform a detection operation of detecting a face region in the first face detection mode for every certain period while the face detection unit repeats a detection operation of detecting a face region in the second face detection mode, and acquires predetermined detection information on the detection condition in the second face detection mode when the face detection unit performs a detection operation of detecting a face region in the first face detection mode, and sets an operation mode of the face detection unit to the first face detection mode when a content of the acquired predetermined detection information does not satisfy the detection condition in the second face detection mode.

4. The image pickup device according to claim 1, wherein the face detection unit performs a detection operation for face regions having plural sizes in the first face detection mode and the second face detection mode, and the predetermined detection information which is acquired by the mode control unit and is on the detection condition in the second face detection mode includes a size of a face region detected by the face detection unit.

5. A face detection method of detecting a face region from an object image picked up by an image sensor, comprising:
repeating a detection operation of detecting a face region from the object image in a first face detection mode, and acquiring predetermined detection information on a detection condition in a second face detection mode having a different detection condition for detecting a face region than the first face detection mode, while repeating the detection operation in the first face detection mode; and
changing over a detection operation mode of detecting a face region from the object image to the second face detection mode when a content of the predetermined detection information satisfies the detection condition in the second face detection mode.

6. A non-transitory computer-readable recording medium recording a face detection control program that controls a computer of an image processing device having a face detection function of detecting a face region from an image to execute processes comprising:
repeating a detection operation of detecting a face region from an object image in a first face detection mode, and acquiring predetermined detection information on a detection condition in a second face detection mode having a different detection condition for detecting a face region than the first face detection mode, while repeating the detection operation in the first face detection mode; and
changing over a detection operation mode of detecting a face region from the object image to the second face detection mode when a content of the acquired predetermined detection information satisfies the detection condition in the second face detection mode.

* * * * *